3,523,291
DATA TRANSMISSION SYSTEM

Jean-Marc Pierret, Falicon, Nice, France, assignor to International Business Machines Corporation, Armonk, N.Y., a corporation of New York Filed Sept. 12, 1967, Ser. No. 667,203
Claims priority, application France, Sept. 21, 1966, 8,054
Int. Cl. H03k *13/02*
U.S. Cl. 340—347 5 Claims

ABSTRACT OF THE DISCLOSURE

A signal to be transmitted is considered to be comprised of a low frequency pulse modulated with its harmonics, the resultant having a decodable maximum or minimum. For digital transmission, appropriate selection of a central pulse with timed and weighted preceding and trailing echoes for each digit approximates such a resultant and enables transmission of digit signals over a line at pulse rates approximating the high frequency limit of the line pass band. The timing of the central pulses and echoes may be so selected that no central pulse overlaps an echo pulse whereby decoding of the received signal is facilitated.

OBJECTS OF THE INVENTION

In data transmission systems, it is clear that economical use of a transmission line requires a full use of the frequency pass band of the line. The presently disclosed coding system has the effect of combining a frequency near the lower end of the pass band and its harmonics throughout the pass band to give a resultant signal which can pass through the line without unacceptable distortion and can be easily decoded at the receiver.

Certain devices which generate pulses of a similar type for coding are already known, as for example, that described in assignees copending application Ser. No. 45,112, filed May 12, 1965 (now Pat. No. 3,419,804) by E. Gorog and M. Melas and titled, "Data Transmission Devices." In this copending application, a digital representing pulse is sent followed after an interval by its inverse and with consecutive pulses interleaved.

The present invention has for its object the disclosure of a method of coding which concentrates most of the spectrum of the transmitted signal within the frequency pass band of the transmission line as well as devices for achieving such transmission and the decoding devices for analyzing the signal at the receiver.

With these objects in mind, the disclosed devices of the invention comprise means for storing a part of the information to be transmitted, means for forming from this information (not necessarily binary digits), an appropriate signal corresponding to each element or to each group of elements and means to combine these signals for forming the final signal to be transmitted.

The foregoing and other objects, features, and advantages of the invention will be apparent from the following more particular description of a preferred embodiment of the invention, as illustrated in the accompanying drawings.

DESCRIPTION OF THE INVENTION

If the usual case of transmission of binary digital signals is considered, it is possible to represent the said signal S($t$) by the following polynomial $$S(t)=\Sigma_n W(t-kT)$$

where W($t$) is a unit square impulse of duration T.

Figures 1, 2:
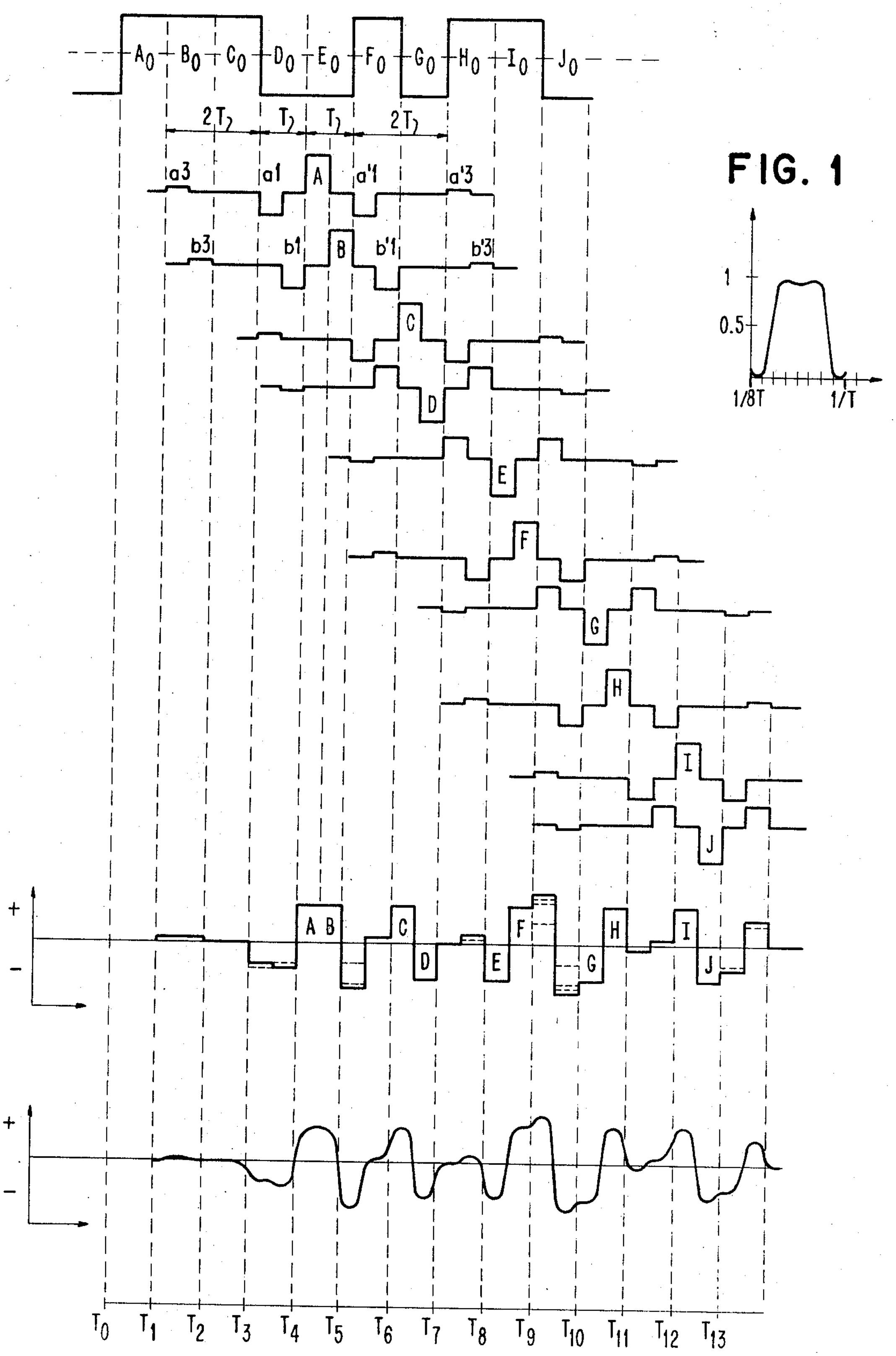
FIG. 1 shows the approximate shape of the spectrum of the transmitted data signal.
FIG. 2 shows some binary signal data elements and the corresponding data pulses transmitted.
Figures 3, 4, 5:
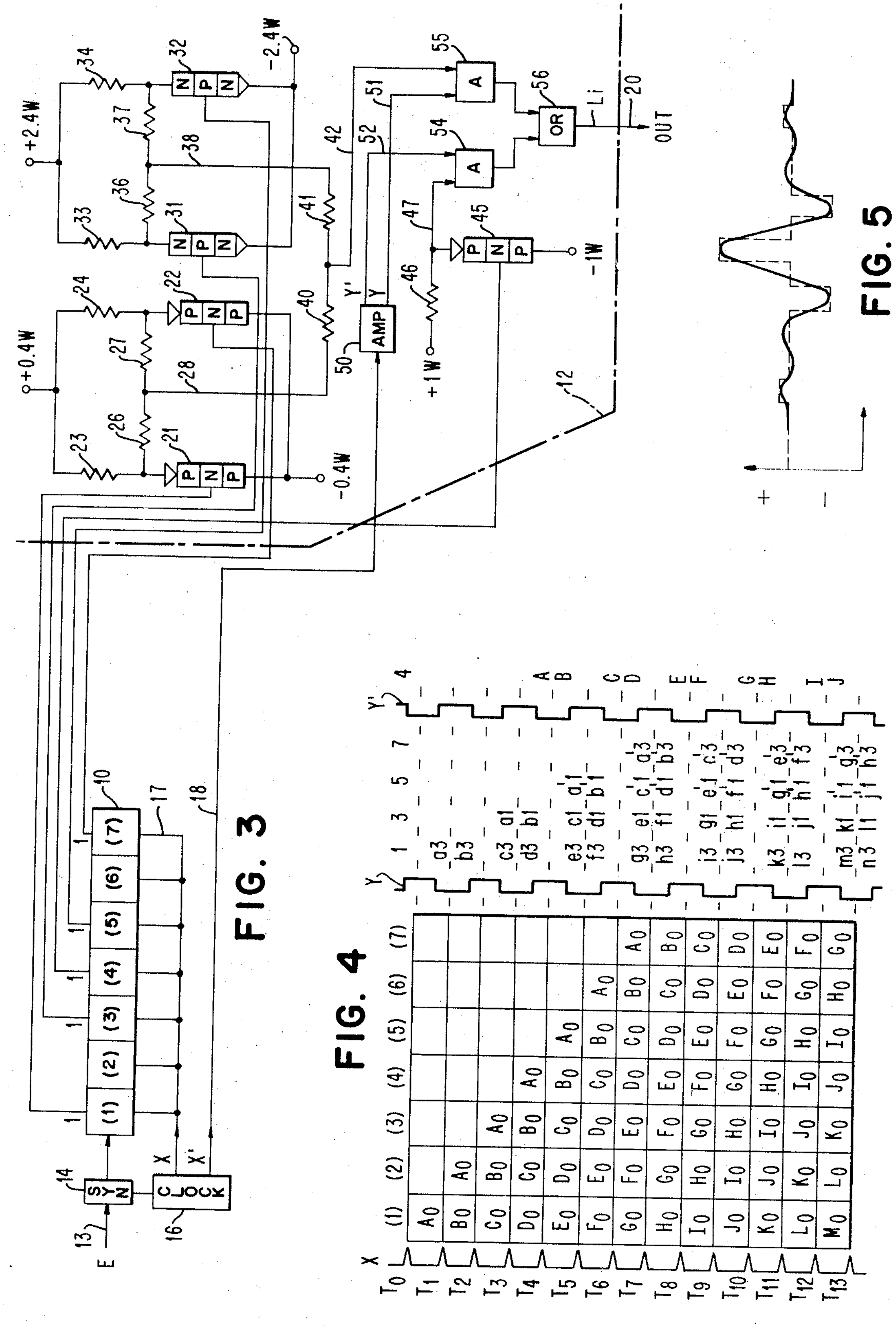
FIG. 3 shows a schematic diagram of the structure used in a preferred embodiment of the invention.
FIG. 4 is a table showing stored data signals and the transmission controlled thereby.
FIG. 5 is a graph of the basic pulse to be transmitted.

By modifying W($t$), by increasing T or by adding some secondary impulses (echoes) to the impulse to be transmitted, the shape of the frequency spectrum occupied by the signal can be modified, but an interference can appear between successive signals. As a mathematical study confirms, by appropriately choosing the position of the secondary impulses and by transmitting the data according to a definite sequence, it is possible to obtain a resultant signal in which some parts correspond with a one-to-one relationship and without ambiguity to the data sent. FIG. 5 shows in full lines a signal fulfilling these requirements for it has a central maximum and two significant lobes on each side at intervals of 1T and 3T from the central maximum with the signal being of no appreciable magnitude at other times. The dotted lines indicate how closely this signal may be approximated by a central square pulse and square pulse echoes of .6 and .1 amplitude at intervals of $\pm 1$ and $\pm 3$ pulse times respectively from the central pulse. As is well known, the solid line signal may be considered as comprised of a fundamental signal of a duration of 8T (eight times the length of one input bit signal) and a number of harmonics of this fundamental signal and hence the solid line signal is spanning a frequency range of ⅛T to 1/T as indicated in FIG. 1. The receiving device can be set to analyze the signal at the instants when these data representing central pulses are received.

The following description of a preferred embodiment of the invention sets out structure wherein the data to be transmitted are binary elements and are accompanied by a particular distribution of secondary impulses. The description is illustrative only and as many variations are possible, is not intended to limit the scope of the invention.

One scheme for a code of this type is to use for each elementary bit signal, a signal composed of a principal impulse of duration $T/2$ (T is the duration of a bit pulse to be transmitted) and of a plurality of echoes, each echo of duration $T/2$ respectively and of weighted amplitude $x1$, $x3$, $x5$ . . ., the echoes being transmitted at instants $\pm$T, $\pm$3T, $\pm$5T . . . respectively with respect to the principal impulse. In this example, to transmit $n$ elements of data starting at time $T_0$ and with two pairs of echoes for each signal element, the principal impulses are transmitted for an interval $T/2$ starting at the instants $T_4$, $T_4+T/2$, $T_4+2T$, $T_4+T/2+2T$, $T_4+4T$, $T_4+T/2+4T$, $T_4+6T$, etc. The principal impulses of each of these data signals do not interfere at these instants and the resultant signal analyzed at the receiver regenerates the original data transmitted. In the example described, the principal impulse and two echoes at $\pm$T and $\pm$3T with amplitudes of .6 and .1 of the principal impulse have been used; the envelope of the spectrum of the transmitted signal then has the shape given by FIG. 1.

FIG. 2 indicates for this example the combination of signals transmitted for ten successive binary data bits. The upper curve shows the ten data bits $A_0$, $B_0$, $C_0$ . . . $J_0$ starting at a time $T_0$. The ten graphs indicated A, B, . . . J show the elementary signals transmitted for the signals $A_0$, $B_0$, . . . $J_0$ and the time delays. It is to be noticed that a part of the signal corresponding to the data bit $A_0$ will interfere with a part of the signal corresponding to the data bit $C_0$ but not with the main pulse of $C_0$. Line T shows the resultant signal transmitted except that the general shape would be modified slightly to take into account the influence of any information preceding A and following J. In any event, the data $A_0$, $B_0$, . . . $J_0$ correspond as indicated in a one-to-one relationship with certain parts of the signal T, and these data bits can be obtained by analyzing the said signal at the instants indicated by the lower line of arrows. Line R indicates the envelope of the transmitted signal of line T as it may be reached at a distant point. At the time points indicated by the arrows, it will be evident that the polarity of this received signal still corresponds to the original signal bits and a sampling can be made at these times to decode the original signal.

FIG. 3 shows a diagrammatic representation of the coding device used for the coding given. This device comprises a shift register 10 having seven positions, and an analog adder 12 whose construction is indicated to the right of the dot-dash line.

The data to be transmitted arrives on the line 13 and its presence on the line is detected by the conventional synchronization device 14 which is not a part of the invention and which triggers the clock 16 to start supplying sharp pulses X at time $T_0+T/2$ and at intervals of T thereafter. These pulses on a line 17 effect data shifts in the register 10 and sample the datum then present on the line 13 into position 1 of this register 10. The clock 16 also supplies on a line 18, impulses X′ derived from the impulses entering on line 13 and in synchronism therewith. These pulses on line 18 control the transmission over the output line 20 of the various signals generated by the analog adder 12 under control of the outputs of shift register 10.

FIG. 2 shows that any signal bit whatsoever, $A_0$ for example, must successively cause the formation and the sending over the line L*i* of pulses *a*3, *a*1, A, *a′*1, and *a′*3, at times $T_1$, $T_3$, $T_4$, $T_5$, and $T_7$ which implies that the knowledge of the datum ($A_0$ in this case) is preserved from its receipt at $T_0$ until $T_7$. Such storage is achieved by the seven position shift register 10 shifted by the impulses X of period T. In FIG. 2, it can also be seen that when the echo *g*3 is to be sent ($T_7$), the echo *e*1, the echo *c′*1 and the echo *a′*3 are also to be sent. These echoes are not separately transmitted but the analog signal sum of these four echoes is sent. It has been mentioned above that for each transmitted principal impulse of amplitude ±W the echoes:

of 0.1 w. at ±3T times and
of −0.6 w. at ±T times are also to be transmitted.

The possible analog values of the sum of the echoes at any time are amplitude signals of +1.4 w., +1.2 w., 1.0 w. +0.2 w., 0, −0.2 w., −1.0 w., −1.2 w. and −1.4 w. with reference to a fixed voltage. In the analog adder 12 to be described, each of the echo signals as well as the main signal is controlled by the contents of shift register 10.

The analog adder 12 comprises a transistor for each echo signal and for the central pulse with all of the outputs being combined onto the output line 20. More specifically, a pair of PNP transistors 21 and 22 have their bases connected for control by stages 1 and 7, respectively, of shift register 10. The collectors of these transistors are connected directly to a voltage supply of −0.4 w. with respect to a reference level. Each emitter is connected through a resistor 23 or 24 to a supply voltage of +0.4 w. and the emitters are connected together by a pair of resistors 26 and 27 having a line 28 connected to their center point. This line 28 will be at a voltage representative of the summation of the echo signals due to signals in stages 1 and 7 of shaft register 10. If neither register stage is set to a significant (positive) signal state, both transistors will be conducting, and their emitters and line 28 will be at the −0.4 w. level. If either stage 1 or 7 is at a significant state, only one transistor will be conductive so that the emitters will be at −0.4 w. and +0.4 w. respectively and line 28 will be at 0 w. whereas if both stages 1 and 7 are at a set level, neither transistor 21 or 22 is conductive and line 28 will be at the +0.4 w. supply level.

To supply the echo pulses required at the ±1 times, a pair of NPN transistors 31 and 32 are provided with their emitters connected to a −2.4 w. supply lead and their bases individually connected to the 3 and 5 stages, respectively, of shift register 10. The collectors of these transistors are individually connected to a +2.4 w. supply through resistors 33 and 34 and are connected together by equal resistors 36 and 37 having a line 38 at their center. Due to the difference in transistor type and the voltage levels, line 38 will be at +2.4 w. if neither stage 3 or 5 is set to a significant stage, will be at 0 w. if only one stage is set and will be at −2.4 w. if both stages are set. A pair of equal resistors 40 and 41 connect lines 28 and 38 so that their centerpoint and line 42 connected thereto will be at the average voltage of the two input lines and this average voltage will be proportional to the analog sum of the four echo signals as above noted.

For central pulse, a single PNP transistor 45 has its base controlled by stage 4 of shift register 10, its collector connected to a supply line at −1.0 w. and its emitter connected through a resistor 46 to a supply line at +1.0 w. The emitter voltage on line 47 connected thereto will thus be −1.0 w. if the stage 4 is not set to a significant digit and transistor 45 is conducting or will be 1.0 w. if the stage 4 is set and transistor 45 is cut off.

The signal X′ on line 18 determines whether the voltage on line 42 or that on line 47 shall be transmitted to the output line 20. Line 18 is the input to an inverter-amplifier 50 which generates a square wave signal Y on an output line 51 and a complimentary signal Y′ on another output line 52 as indicated in FIG. 4. Lines 52 and 47 are both inputs to an AND circuit 54 which will therefore have an output corresponding to the signal on line 47 when signal Y′ is down and lines 51 and 42 are inputs to a second AND 55 which will have an output signal when signal Y is down. The outputs of AND's 54 and 55 are combined in an OR circuit 56 whose output line 20 will therefore carry the desired signal for transmission.

It has been previously noted that for each data signal, say $A_0$, the formation in the circuits and the sending over the line of the signal A and echoes *a*3, *a*1, *a′*1 and *a′*3 at times T, T3, T4, T5, and T6 are triggered by signal X′. It follows from this that A is formed at the moment when $A_0$ is in the register 10 at the position 4 whose output is connected to the base of the transistor 45 so as to block it if $A_0=1$, and to supply a voltage of value V.

Referring again to FIG. 2 it can be seen that if for a data signal as $A_0$, one transmits the echo *a*3 starting at the time T, then the echo *a*1 starting at the time T3, then the signal A starting at T4 followed by echo *a′*3 starting at T5 and lastly the echo *a′*1 starting at time T7, then the signal $A_0$ would be transmitted in the form of an output signal which would supply the signal in an intelligible way at a speed half that of its arrival at the coding device. To compensate for this slow down, the data bits are paired and each signal element or echo corresponding to a first data bit is transmitted for a period $T/2$, and is immediately followed by the corresponding element of the next data bit of the pair.

It can also be seen from FIG. 2, that at any time, the output signal on line 20 can be either the central pulse controlled by stage 4 of shift register 10 or can be the sum of four echoes controlled by the signals in stages 1, 3, 5, and 7 of register 10. FIG. 4 is a tabulation for each interval T of the signals in shift register 10 and the output signals on line 20 together with the time relationship of the X, Y, and Y′ signals. Consider for example, the situation at the instant T6. At this time shift register 10 contains the signals $A_0$ to $F_0$ in stages 6 to 1 respectively. As signal Y′ is negative (left in FIG. 4) at this time, the signal $C_0$ in stage 4 of shift register 10 controls the signal on line 47 which is passed through AND 54 and OR 56 to output 20 as the signal C. One-half the period later, clock 16 puts a shift pulse of line 17 to shift data bit $D_0$ into stage 4 and for the remainder of the period, the output signal on line 20 is controlled by the $D_0$ bit.

At time T7, signal Y′ becomes positive and control shifts to signal Y which is now negative and gates out the signal on line 42 through AND 55 and OR 56 to output line 20. This signal on line 42 is the sum of the four transistor signals controlled by stages 1, 3, 5, and 7 of shift register 10 and hence is the sum of the *g*3, *e*1, *c*′1, and *a*′3 echoes. After a period of one-half T, i.e. at T7 1/2, another shift pulse X on line 17 shifts the data bit signals $H_0$, $F_0$, $D_0$, and $B_0$ into stages 1, 3, 5, and 7 of register 10 and the line 20 output until T8 will be the sum of the echoes *h*3, *f*1, *d*′1 and *b*′3. At T8 signals Y and Y′ again reverse and the above cycle is repeated with each data bit signal shifted two stages to the right.

Thus the sums of four echoes such as those of *g*3, *e*1, *c*′1, *a*′3 appear, as has been seen, on line 42 and the principal signals such as E appear on line 47. Clearly then the signal on line 42 will be transmitted with a period 2T and during a duration T, and the signal on line 52 will be transmitted similarly, but alternately with that on line 42. Moreover, the shifting of data in shift register 10 will be effected so that there appears on line 42:

during one-half of the time a signal which is the sum of 4 echoes,
during the other half of the time a signal which is the sum of the 4 following echoes, and so that there appears on line 52:

during one half of the time a signal controlled by a first data bit and
during the other half of the time a signal controlled by the following data bit.

The combined signal, T in FIG. 2, is thus sent out over line 20 to be transmitted either directly or after other operations such as modulation on a carrier. At the receiver, the signal received may be distorted to have an envelope such as that on line R. However, an analysis of signal R at the times indicated by the arrows regenerates the signals $A_0$, $B_0$, $C_0$ . . . $J_0$ without ambiguity since at these instants it is sufficient to know if signal R is above or below the reference voltage level. For such decoding, the clock at the receiver must be appropriately adjusted to enable the sampling of the received signal at the correct times but as such synchronizable clocks are known in the art and are not a part of this invention, it is not further described.

While the invention has been particularly shown and described with reference to a preferred embodiment thereof, it will be understood by those skilled in the art that various changes in form and details may be made therein without departing from the spirit and scope of the invention.

What is claimed is:

1. In a system for transmitting data represented by binary data signals, an encoding device to convert signals to form utilizing more fully a transmission frequency band, said device comprising:
an input connection to receive said data signals,
a synchronizing device responsive to data signals on said input connection to determine the transition time of said data signals,
a clock controlled by said synchronizing device to generate two sets of regularly spaced signals, a first set at said transition times and a second set at times approximately midway between said transition times,
a shift register having a plurality of data storage stages and responsive to said second set of clock pulses to accept data into the storage stage at one end and to shift data stored in all stages toward the other end,
a weighted signal generator connected to each of several stages of said shift register and controlled in accordance with the data stored in its connected stage to generate a weighted signal,
a signal generator controlled by said first set of clock pulses to provide a pair of complementary pulse signals, each pulse of a signal being equal in duration to the duration of a binary data signal,
an output terminal, and
means controlled by one of said complementary pulse signals to transmit to said output terminal a signal which is the average of the weighted signals of a group of said weighted signal generators and controlled by the other of said complementary pulse signals to transmit to said output terminal, a weighted signal from the remainder of said weighted signal generators.

2. A data transmititng system as set out in claim 1 wherein said group of said weighted signal generators is comprised of those connected to alternate stages, starting at the one end, of said shift register and wherein said remainder of said weighted signal generators includes one controlled by the data in the middle stage of said shift register.

3. A data signal encoder to convert binary signals to a pseudo-analog form for transmission, said encoder including:
a shift register comprising a central digit storage stage and an odd number of digit storage stages on both the input and terminal ends,
a signal input line carrying said binary bit signals,
a synchronizer-clock to detect the occurrence of bit signals on said line and to generate two sets of pulses synchronized with the arrival of said bit signals, a first set of pulses being in phase with said bit signals and a second set being delayed by one-half of the period of a bit signal,
means connecting said second set of pulses to said shift register to shift data representations therein, each shift moving a data representation one stage toward the terminal end and to enter into the first stage at the input end, a data representation of the binary bit signal then on the signal input line,
a plurality of weighted bit generators, one connected to each odd numbered stage of said shift register and one to said middle stage, each generator providing a voltage of one polarity and of a magnitude related to the stage of the shift register to which it is connected if the related stage stores a representation of a significant binary bit signal or to provide a voltage of the opposite polarity but of the same magnitude if the stage stores a representation of a non-significant binary bit signal,
an analog adder connected to the weighted bit generators for all of the odd numbered stages of said shift register to supply an output voltage proportional to the sum of the voltages of the connected generators,
an output signal terminal and switching means controlled by said first set of synchronizer-clock signals to connect said output signal terminal to the output of said analog adder during the period of alternate ones of said binary bit signals and to connect said output signal terminal to the output of the weighted bit generator controlled by the central stage of said shift register during the others of said binary bit signals.

4. A data signal encoder as set out in claim 3 in which said switching means comprises:
a generator producing both a square wave signal and its compliment signal, each signal having a period of twice a binary bit signal period and changing potential in synchronism with said bit signals, a gate circuit controlled by one of said signals to pass the output of said analog adder, a second gate circuit controlled by the other of said signals to pass the output of the weighted bit generator connected to the central stage, and a combining circuit to pass the outputs of both of said gate circuits to said output terminal.

5. A data signal encoder to convert binary bit signals to a pseudo-analog form for transmission, said encoder including:

a data storage device to retain a representation of the last ($4N-1$) of the binary bit signals received, a plurality of voltage generators, one for each odd numbered bit signal representation, each generator normally producing a voltage of one polarity and magnitude and controlled to produce a voltage of the same magnitude but of opposite polarity when connected to a representation of a significant bit signal in said data storage device, another voltage generator connectable to the central binary bit signal representation in said storage device, means connecting all of said voltage generators to corresponding signal representations of said data storage device, said connecting means including circuits controlled by said binary bit signals to change the connecting means of each voltage generator to the next succeeding bit signal representation, an analog adder to sum all of the voltages produced by said plurality of voltage generators, an output terminal and switching means controlled by said binary bit signals intermediate the control by said signals over said connecting means circuits, to switch the output terminal between the output of said analog adder and the output of said other voltage generator.

References Cited

UNITED STATES PATENTS

| | | |
|---|---|---|
| 3,414,818 | 12/1968 | Reidel. |
| 3,056,085 | 9/1962 | James. |
| 3,201,777 | 8/1965 | Brown. |
| 3,395,400 | 7/1968 | De Witt. |
| 3,320,534 | 5/1967 | Altonji. |

MAYNARD R. WILBUR, Primary Examiner

J. GLASSMAN, Assistant Examiner

U.S. Cl. X.R.

179—15